(12) United States Patent
Kuwayama et al.

(10) Patent No.: US 9,205,870 B2
(45) Date of Patent: Dec. 8, 2015

(54) VEHICLE FRAME MEMBER STRUCTURE WITH EXCELLENT IMPACT RESISTANCE PERFORMANCE

(71) Applicant: Nippon Steel & Sumitomo Metal Corporation, Tokyo (JP)

(72) Inventors: Takuya Kuwayama, Tokyo (JP);
Shigeru Yonemura, Tokyo (JP);
Masahiko Yoshino, Tokyo (JP);
Kazuhiko Honda, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/403,367

(22) PCT Filed: Jun. 3, 2013

(86) PCT No.: PCT/JP2013/065358
§ 371 (c)(1),
(2) Date: Nov. 24, 2014

(87) PCT Pub. No.: WO2013/183587
PCT Pub. Date: Dec. 12, 2013

(65) Prior Publication Data
US 2015/0175208 A1    Jun. 25, 2015

(30) Foreign Application Priority Data
Jun. 4, 2012  (JP) .................................. 2012-127441

(51) Int. Cl.
*B60N 99/00* (2006.01)
*B62D 21/15* (2006.01)
*B62D 21/02* (2006.01)

(52) U.S. Cl.
CPC ............. *B62D 21/152* (2013.01); *B62D 21/02* (2013.01)

(58) Field of Classification Search
CPC .............................. B62D 21/152; B62D 21/02
See application file for complete search history.

(56) References Cited

U.S. PATENT DOCUMENTS

2014/0167450 A1\* 6/2014 Sotoyama et al. ....... 296/187.09

FOREIGN PATENT DOCUMENTS

| CN | 201140730 | 10/2008 | |
| EP | 1555191 A1 \* | 7/2005 | ............. B62D 21/15 |

(Continued)

OTHER PUBLICATIONS

International Search Report dated Jul. 30, 2013 issued in corresponding PCT Application No. PCT/JP2013/065358 [with English Translation].

(Continued)

*Primary Examiner* — Lori L Lyjak
(74) *Attorney, Agent, or Firm* — Kenyon & Kenyon LLP

(57) ABSTRACT

A vehicle frame member structure has a closed cross-sectional structure including a pair of first wall portions, and a pair of second wall portions connected to the pair of the first wall portions, in which first beads are provided on the pair of first wall portions along a circumferential direction of the closed cross-sectional structure, a second bead is provided on either of the pair of second wall portions along the closed cross-sectional circumferential direction on a line extending from the first bead in the circumferential direction, the first and second beads are connected in two corner portions between the first wall portions and the second wall portion, a recessed embossed portion is provided in a connection portion of the first and second beads in at least one of the corner portions, and the sheet thickness of the embossed portion is larger than that of the first or second wall portion.

4 Claims, 15 Drawing Sheets

(56) References Cited

FOREIGN PATENT DOCUMENTS

| | | |
|---|---|---|
| JP | 04-231268 | 8/1992 |
| JP | 07-042737 | 8/1995 |
| JP | 07-228267 | 8/1995 |
| JP | 2001-158377 | 6/2001 |
| JP | 2005-178417 | 7/2005 |
| JP | 2006-206000 | 8/2006 |

OTHER PUBLICATIONS

Notice of Allowance dated Apr. 25, 2014 issued in corresponding Japanese Application No. 2013-554126 [with English Translation].

Chinese Office Action dated Apr. 29, 2015 issued in corresponding Chinese Application No. 201380029108.7 [with English Translation of Search Report].

* cited by examiner

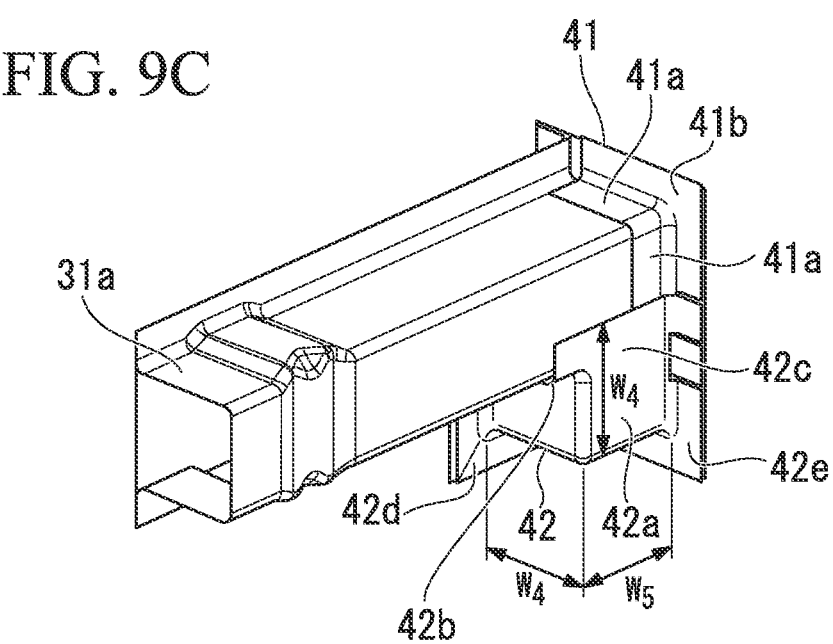

VEHICLE FRAME MEMBER STRUCTURE WITH EXCELLENT IMPACT RESISTANCE PERFORMANCE

TECHNICAL FIELD OF THE INVENTION

This application is a national stage application of International Application No. PCT/JP2013/065358, filed Jun. 3, 2013, which claims priority to Japanese Patent Application No. 2012-127441, filed on Jun. 4, 2012, each of which is incorporated by reference in its entirety.

The present invention relates to a vehicle frame member structure having excellent impact resistance performance.

RELATED ART

It is necessary that a frame member such as a front side member of a vehicle be designed such that the maximum reaction force of the frame member has an appropriate value when an impact load is applied. The maximum reaction force of the frame member varies depending on the material and shape of the member and thus a number of parameters have to be considered when the frame member is designed.

For example, in order to reduce the weight of a vehicle, when the thickness of a steel sheet constituting the frame member is reduced, the maximum reaction force of the frame member is reduced and thus the structural member is easily buckled. Therefore, it is necessary to design a frame member having a high maximum reaction force while reducing the weight of the vehicle by reducing the thickness of the steel sheet.

In Patent Document 1 below, there is disclosed a vehicle frame member having a closed cross-sectional structure in which recessed stripes provided on wall portions that face each other are continued to a projected stripe which is provided on one wall portion and interposed between these wall portions through corner portions. When an input load is input to the vehicle frame member in a compression direction, stress is concentrated on the recessed stripes and the projected stripe and crushing deformation of the corner portion is promoted. Thus, the wall portions are crushed and deformed around the recessed stripes and the projected stripe.

In addition, in Patent Document 2 below, there is disclosed a frame member structure including plural first beads arranged on at least one wall portion of wall portions constituting each side having a polygonal closed cross-sectional shape with predetermined intervals, and plural second beads arranged at positions that do not overlap the axial positions of the first beads on a wall portion adjacent to the wall portion on which the first beads are provided. With the frame member structure, stable axial compression deformation using both the first beads and the second beads as a starting point can be obtained and thus the initial buckling load can be increased.

PRIOR ART DOCUMENT

Patent Document

[Patent Document 1] Japanese Unexamined Patent Application, First Publication No. H4-231268
[Patent Document 2] Japanese Unexamined Patent Application, First Publication No. 2001-158377

DISCLOSURE OF THE INVENTION

Problems to be Solved by the Invention

However, in a case of a front side member as an example of a frame member, an engine is mounted on the front side member through an engine mount and a load of the engine is constantly applied thereto. In addition, a front cross member is connected to the tip end of the front side member through a coupling member, and a load is applied through the front cross member at the time of impact. Therefore, the input load at the time of impact may be applied from a direction that is slightly shifted from the axial direction of the front side member. Further, there is a case in which the front side member is attached at an angle slightly inclined to the longitudinal direction of a vehicle and even in this case, the input load at the time of impact may be applied from a direction that is slightly shifted from the axial direction of the front side member.

As described above, a load is usually input to the front side member, and further, the input load at the time of impact may be applied from a direction that is slightly shifted from the axial direction of the front side member and thus a bending moment may be applied at the time of impact. Therefore, when the frame member described in Patent Document 1 or 2 is applied to the front side member, the impact load is not uniformly applied to the positions in which the projected stripe and the recessed stripe or the first beads and the second beads are formed along a closed cross-sectional circumferential direction. For this reason, it is assumed that before the front side member is buckled and deformed sufficiently to absorb impact energy, the front side member is bent at the positions in which the projected stripe and the recessed stripe or the first beads and the second beads are formed and thus cannot absorb impact energy sufficiently.

The present invention is made in consideration of the above-described problems and an object thereof is to provide a vehicle frame member structure having excellent impact resistance performance.

Means for Solving the Problem

The gist of the present invention is as follows.

(1) According to a first aspect of the present invention, there is provided a vehicle frame member structure having a closed cross-sectional structure including a pair of first wall portions, and a pair of second wall portions connected to the pair of the first wall portions, in which first beads are provided on the pair of first wall portions along a circumferential direction of the closed cross-sectional structure, a second bead is provided on either of the pair of second wall portions along the closed cross-sectional circumferential direction on a line extending from the first bead in the circumferential direction, the first beads and the second bead are connected to each other in two corner portions between the first wall portions and the second wall portion, a recessed embossed portion is provided in a connection portion of the first bead and the second bead in at least one of the corner portions, and the sheet thickness of the embossed portion is larger than the sheet thickness of one of the first wall portion and the second wall portion.

(2) In the vehicle frame member structure according to (1), the first bead may have a first flat surface parallel to a surface of the first wall portion, the second bead may have a second flat surface parallel to a surface of the second wall portion, and the embossed portion may be provided in a connection portion of the first flat surface and the second flat surface.

(3) In the vehicle frame member structure according to (1) or (2), the embossed portion may be constituted of two triangular wall surfaces.

(4) In the vehicle frame member structure according to any one of (1) to (3), of the two corner portions, the embossed portion may be provided in only an inner peripheral corner portion of deflection caused by a bending moment that is applied to the vehicle frame member structure at the time of impact.

(5) In the vehicle frame member structure according to any one of (1) to (4), any one of the first bead and the second bead may be a projected bead and the other thereof may be a recessed bead.

Effects of the Invention

According to the vehicle frame member structure described in (1), since the recessed embossed portion is provided in the connection portion of the first bead and the second bead in at least one of the corner portions, the deflective strength of the first wall portion and the second wall portion around the first bead and the second bead is improved and the reaction force to deflection deformation caused by a bending moment is improved and thus the impact resistance performance can be improved. Further, since the sheet thickness of the embossed portion is larger than the sheet thickness of the first wall portion or the second wall portion, the rigidity of the first wall portion and the second wall around the first bead and the second bead is improved and the deflective strength is further improved. Accordingly, the reaction force to deflection deformation caused by a bending moment is further improved and thus the impact resistance performance can be further improved.

According to the vehicle frame member structure described in (2), since the first bead has a first flat surface parallel to a surface of the first wall portion, the second bead has a second flat surface parallel to a surface of the second wall portion, and the embossed portion is provided in a connection portion of the first flat surface and the second flat surface, the deflective strength of the first wall portion and the second wall portion around the first bead and the second bead is further improved. Accordingly, the reaction force to deflection deformation caused by a bending moment is improved and thus the impact resistance performance can be improved.

According to the vehicle frame member structure described in (3), since the embossed portion is constituted of two triangular wall surfaces, the shape of the embossed portion is simple and thus the embossed portion is easily press-formed. In addition, the amount of strain accompanied by a reduction in the sheet thickness is small and the deflective strength of the first wall portion and the second wall portion around the first bead and the second bead can be prevented from being lowered.

According to the vehicle frame member structure described in (4), since the embossed portion is provided in only an inner peripheral corner portion of deflection caused by a bending moment in the vehicle frame member structure out of the two corner portions, the deflective strength of the first wall portion and the second wall portion around the first bead and the second bead is further improved and the reaction force to deflection deformation caused by the bending moment is further improved and thus the impact resistance performance can be further improved.

According to the vehicle frame member structure described in (5), since any one of the first bead and the second bead is a projected bead and the other thereof is a recessed bead, stress is concentrated on the first bead and the second bead and crushing deformation of the corner portion is promoted. Thus, the first wall portion and the second wall portion are crushed and deformed around the first bead and the second bead, and the vehicle frame member structure can absorb the impact energy effectively.

BRIEF DESCRIPTION OF THE DRAWINGS

FIG. 9C is a perspective view corresponding to the side view of FIG. 9A.

EMBODIMENTS OF THE INVENTION

[First Embodiment]

Figure 1A:
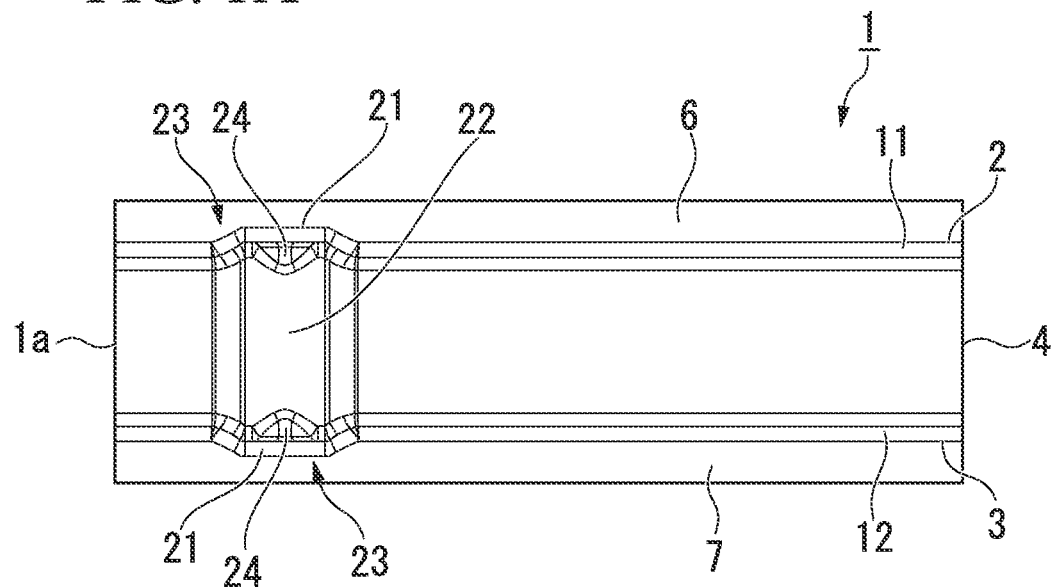
FIG. 1A is a side view showing a vehicle frame member structure according to a first embodiment of the present invention.
Figure 1B:
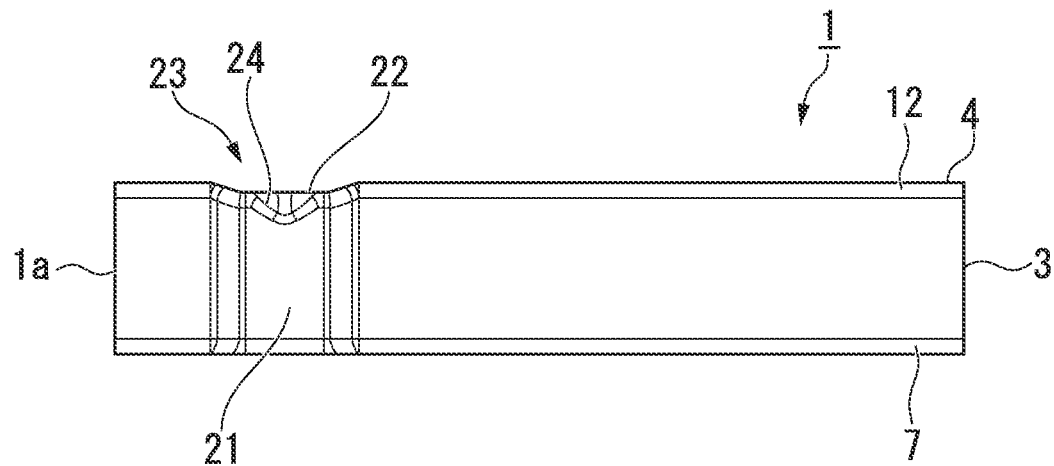
FIG. 1B is a plan view corresponding to the side view of FIG. 1A.
Figure 1C:
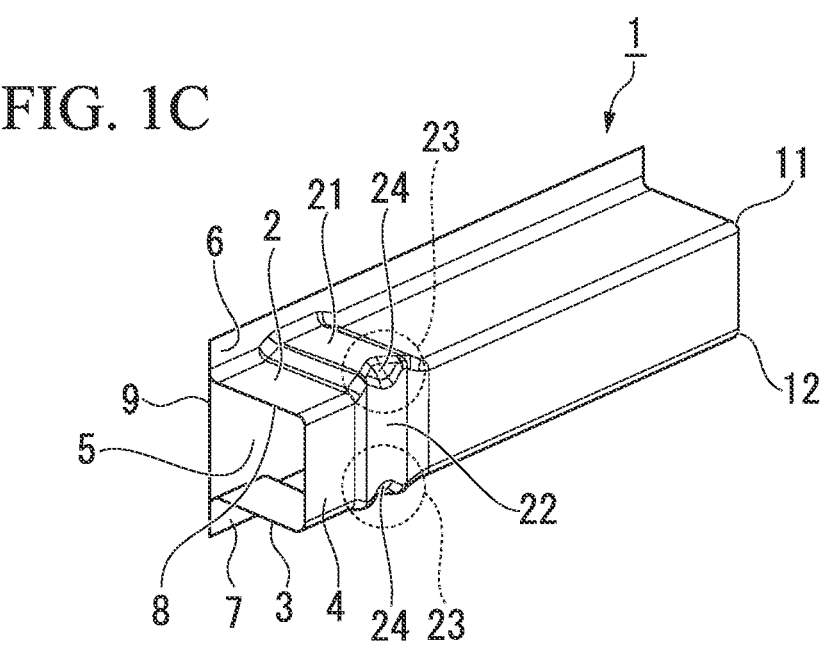
FIG. 1C is a perspective view corresponding to the side view of FIG. 1A.
Figure 2A:
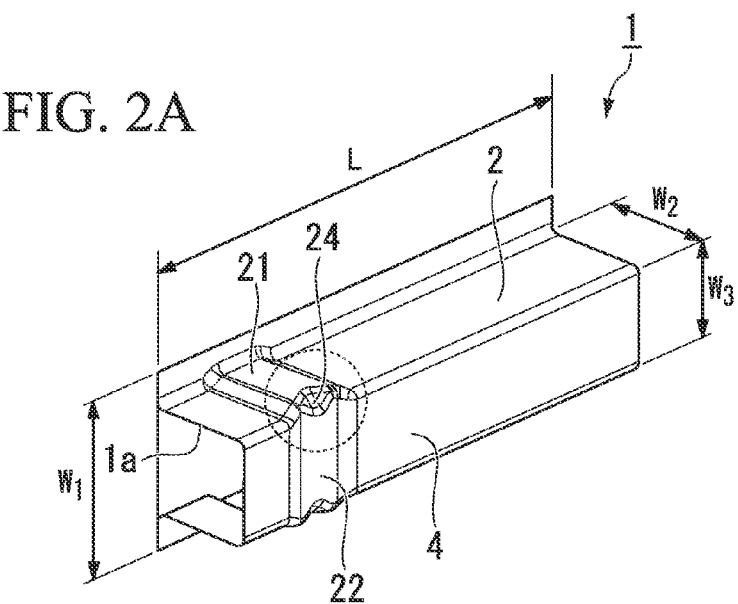
FIG. 2A is a perspective view showing the vehicle frame member structure according to the first embodiment of the present invention.
Figure 2B:
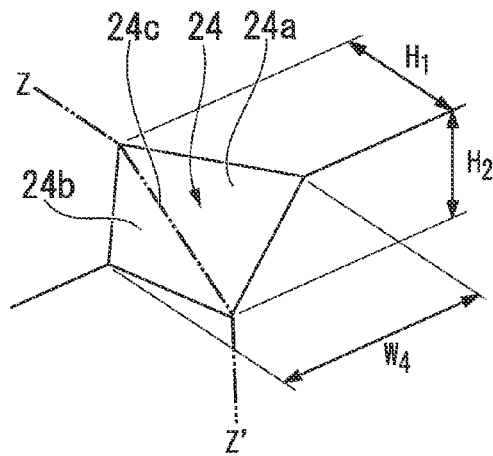
FIG. 2B is an enlarged perspective view of an embossed portion of the structure.
Figure 2C:
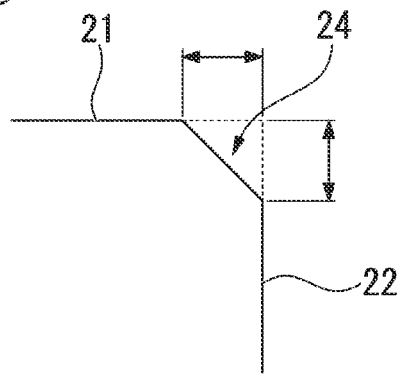
FIG. 2C is an enlarged cross-sectional view of the embossed portion corresponding to line Z-Z' of FIG. 2B.

Hereinafter, a first embodiment and examples of the present invention will be described with reference to drawings.

As shown in FIGS. 1A to 1C and 2A to 2C, a vehicle frame member structure 1 according to an embodiment has a closed cross-sectional structure including a pair of first wall portions (hereinafter, referred to as horizontal wall portions 2 and 3), and a pair of second wall portions connected to the pair of horizontal wall portions 2 and 3 (hereinafter, referred to as vertical wall portions 4 and 5). For example, the vehicle frame member structure 1 includes a first member 8 which has a hat-shaped cross section and is constituted of the pair of horizontal wall portions 2 and 3, one vertical wall portion 4, and a plate-like second member 9 constituting the other vertical wall portion 5. The pair of horizontal wall portions 2 and 3 of the first member 8 are provided with flange portions 6 and 7, respectively. Then, the first member 8 and the second member 9 are integrally connected by spot-welding of the second member 9 to the flange portions 6 and 7 of the first member 8 and thus the closed cross-sectional structure including the horizontal wall portions 2 and 3 and the vertical wall portions 4 and 5 is formed.

The first member 8 is produced by press-forming a steel sheet to have a hat shape when seen from a cross section. As the steel sheet constituting the first member 8, high strength steel sheet for a vehicle is suitably used and particularly high strength thin steel sheet, such as TRIP steel, in which work hardening easily occurs is preferably used. High strength steel sheet for a vehicle is also suitably used for the second member 9 in the same manner.

The pair of horizontal wall portions 2 and 3 and the vertical wall portion 4 of the first member 8 are connected to each other through the corner portions 11 and 12. In addition, first beads 21, which are projected beads formed along a closed cross-sectional circumferential direction, are provided on the pair of horizontal wall portions 2 and 3 of the first member 8. The first beads 21 are each constituted of a pair of inclined surfaces inclined from the horizontal wall portion 2 or 3, and a flat surface parallel to the surface of the horizontal wall portion 2 or 3 and positioned at the center of the pair of inclined surfaces. Further, a second bead 22, which is a recessed bead formed along the closed cross-sectional circumferential direction, is provided on the vertical wall portion 4 of the first member 8. The second bead 22 is provided on the line extending from the first bead 21 in the closed cross-sectional circumferential direction. The second bead 22 is constituted of a pair of inclined surfaces inclined from the vertical wall portion 4 and a flat surface parallel to the surface of the vertical wall portion 4 and positioned at the center of the pair of inclined surfaces. Then, the first beads 21 and the second bead 22 are connected to each other at two corner portions 11 and 12, respectively. Connection portions 23 of the first and second beads 21 and 22 are corner portions constituted of the first beads 21 and the second bead 22. The connection portions 23 are placed at positions shifted from the corner portions 11 and 12 which connect the horizontal wall portions 2 and 3 and the vertical wall portion 4 by the height of the first beads 21 and the depth of the second bead 22. As shown in FIGS. 1A to 1C and 2A to 2C, the first bead 21 is a projected bead and the second bead 22 is a recessed bead. However, the present invention is not limited thereto. For example, the first bead 21 may be a recessed bead and the second bead 22 may be a projected bead, or both the first bead 21 and the second bead 22 may be projected beads or recessed beads.

Next, as shown in FIGS. 1A to 1C and 2A to 2C, recessed embossed portions 24 are provided in the connection portions 23 of the first beads 21 and the second bead 22 at the respective corner portions 11 and 12. It is preferable that the embossed portion 24 be constituted of two triangular wall surfaces 24a and 24b and both the triangular bottom sides be connected. In this case, the shape of the entire embossed portion 24 as seen from a plan view is a rectangular shape close to a rhombus. In addition, a portion in which the two triangular wall surfaces 24a and 24b are connected to each other is formed as a valley fold portion 24c along the closed cross-sectional circumferential direction.

The embossed portion 24 is formed by recessing the corner portions 11 and 12 that are formed between the horizontal wall portions 2 and 3 and the vertical wall portion 4 when the steel sheet is press-formed and worked into the first member 8. Since such a process is performed, the embossed portion 24 is formed as a thickened portion in which the peripheral steel is dammed up. Accordingly, the sheet thickness of the embossed portion 24 is larger than the sheet thickness of the horizontal wall portion 2 and 3 or the vertical wall portion 4. The sheet thickness of the embossed portion 24 is preferably about 1.1 times to 1.4 times, and more preferably about 1.15 times to 1.2 times of the sheet thickness of the horizontal wall portions 2 and 3 or the vertical wall portion 4. Further, since the amount of working of the embossed portion 24 is larger than that of the peripheral portion, the work hardening of the embossed portion 24 is promoted. Thus, the embossed portion 24 has a higher hardness than the hardness of the horizontal wall portions 2 and 3 or the vertical wall portion 4.

In addition, the embossed portion 24 may be provided in only one of two connection portions of the two first beads 21 and 21 provided on the pair of horizontal wall portions 2 and 3 and the second bead 22 provided on the vertical wall portion 4. Particularly, when it is assumed that a bending moment is applied to the frame member structure 1 at the time of impact, it is preferable that the embossed portion 24 be provided in only a portion corresponding to the inner peripheral side of deflection caused by the bending moment. When the bending moment is applied to the frame member structure 1, compression stress is concentrated on the inner peripheral side of the deflection. However, when the embossed portion 24 is provided on the inner peripheral side, the first and second beads 21 and 22 can be reinforced. Further, as shown in FIGS. 1A to 1C and 2A to 2C, the embossed portions 24 may be provided on both of the two connection portions of the first beads 21 and the second bead 22. When the embossed portions are provided in both the connection portions, the stress concentration occurring when an impact load is input can be dispersed.

For example, the frame member structure 1 according to the embodiment is applied to a structural member, such as a front side member of a vehicle, to which an impact load is applied from the axial direction. The front side member is constituted of an outer panel arranged on the outer side of the vehicle width direction and an inner panel arranged on the inner side of the vehicle width direction. For example, the frame member structure 1 according to the embodiment can be applied to a front side member having the first member 8 as an inner panel and the second member 9 as an outer panel.

In addition, when an impact load is applied to a vehicle, the load is applied to the front side member in the axial direction and it is necessary that the front side member be reliably axially compression-deformed without bending at the axial intermediate portion to reliably absorb the impact energy at the time of impact. When the reaction force to the impact load is small, buckling easily occurs with a smaller impact load. Thus, it is necessary to set the reaction force to the impact load to be equal to or larger than a predetermined magnitude.

In order to solve the above problem, in the frame member structure 1 according to the embodiment, the first beads 21 and the second bead 22 function as a starting point of axial compression deformation when an impact load is applied and the crushing deformation of the horizontal wall portions 2 and 3 and the vertical wall portion 4 around the first beads 21 and the second bead 22 is promoted so that the frame member structure can absorb the impact energy. Further, even when the bending moment is applied to the frame member structure 1 when the impact load is input, the embossed portions 24 are provided in the connection portions of the first beads 21 and the second bead 22 and thus the deflective strength of the first beads 21 and the second bead 22 on which the stress of the bending moment is relatively easily concentrated can be increased. Therefore, the frame member structure 1 can be prevented from being bent until the frame member structure 1 sufficiently absorbs the impact energy.

Since the sheet thickness of the embossed portion 24 is larger than the sheet thickness of the horizontal wall portions 2 and 3 or the vertical wall portion 4, the rigidity of the horizontal wall portions 2 and 3 and the vertical wall portion 4 around the first beads 21 and the second bead 22 increases and the deflective strength is further improved. Further, the reaction force to the deflection deformation caused by the bending moment can be further improved and the impact resistance performance can be further improved.

Further, when the embossed portion 24 is constituted of the two triangular wall surfaces 24a and 24b, the shape of the embossed portion 24 is simple and thus the embossed portion is easily press-formed. Therefore, the amount of strain accompanied by a reduction in the sheet thickness is small and thus the deflective strength of the horizontal wall portions 2 and 3 and the vertical wall portion 4 around the first beads 21 and the second bead 22 can be prevented from being lowered.

In addition, when the embossed portion is provided on only an inner peripheral corner portion of the deflection caused by the bending moment in the vehicle frame member structure 1 out of the two corner portions 11 and 12, the deflective strength of the horizontal wall portions 2 and 3 and the vertical wall portion 4 around the first beads 21 and the second bead 22 can be further improved. Therefore, the reaction force to the deflection deformation caused by the bending moment is further improved and thus the impact resistance performance can be further improved.

EXAMPLE 1 OF FIRST EMBODIMENT AND COMPARATIVE EXAMPLE 1

Figure 3A:
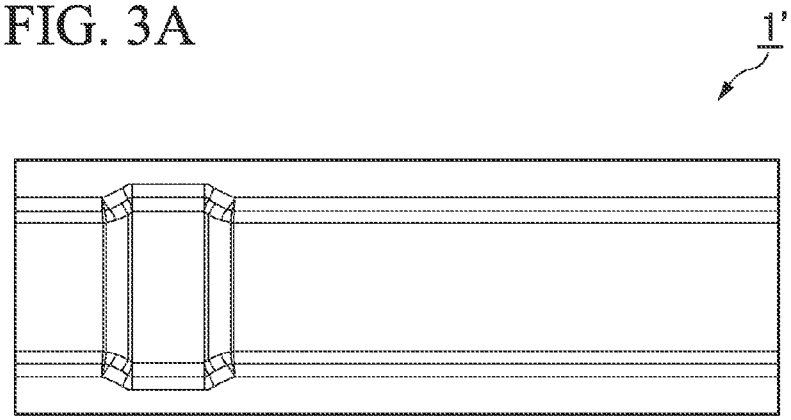
FIG. 3A is a side view showing an example of a vehicle frame member structure of the related art.
Figure 3B:
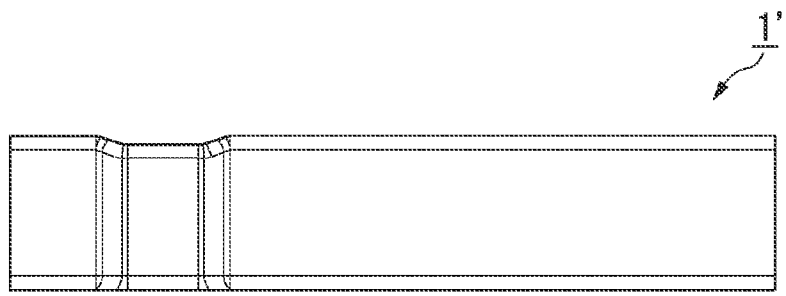
FIG. 3B is a plan view corresponding to the side view of FIG. 3A.
Figure 3C:
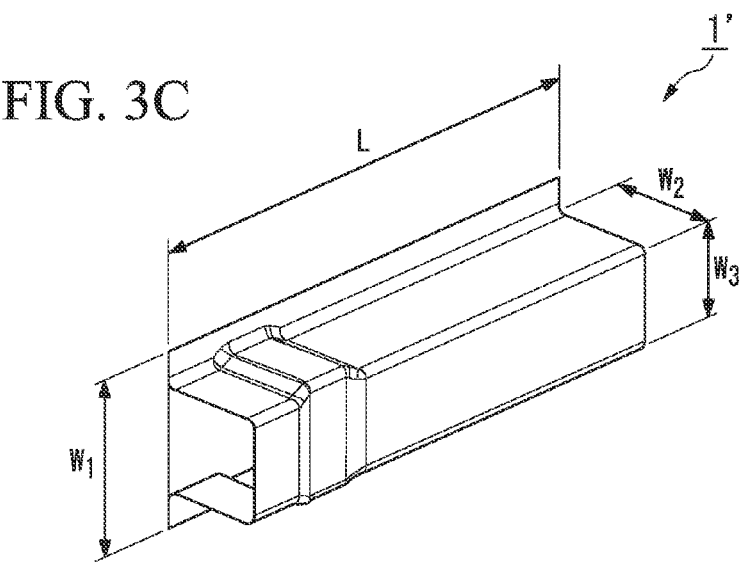
FIG. 3C is a perspective view corresponding to the side view of FIG. 3A.

Frame member structures shown in FIGS. 1A to 1C, 2A to 2C, and 3A to 3C were produced and the impact performance thereof was evaluated. A frame member structure 1 shown in FIGS. 1A to 1C and 2A to 2C is Example 1 and a frame member structure 1' shown in FIGS. 3A to 3C is Comparative example 1. Comparative example 1 shown in FIGS. 3A to 3C has the same configuration as that of Example 1 shown in FIGS. 1A to 1C and 2A to 2C except that the embossed portion is not provided.

When the frame member structures shown in FIGS. 1A to 1C, 2A to 2C, and 3A to 3C were prepared, a steel sheet shown in Table 1 was press-formed to form the first member having a hat shape when seen from a cross section. In addition, the plate-like second member was formed by using the steel sheet shown in Table 1. Then, the first member and the second member were spot-welded to produce a vehicle frame member structure having a closed cross-sectional structure. The interval of the spot-welding in the longitudinal direction is 15 mm at both upper and lower ends only and 30 mm in portions other than the upper and lower ends.

TABLE 1

| Steel type | t/mm | Mechanical properties | | |
| --- | --- | --- | --- | --- |
| | | Yield stress/MPa | Tensile strength/MPa | Elongation/% |
| 780 MPa-class steel sheet | 1.5 | 493 | 844 | 27 |

In the vehicle frame member structures shown in FIGS. 1A to 1C, 2A to 2C, and 3A to 3C, an axial length L is 300 mm, a total width $W_1$ thereof is 100 mm, a width $W_2$ of each of the horizontal wall portions 2 and 3 is 60 mm, and a width $W_3$ of the vertical wall portion 4 is 60 mm. Further, the total width of the first bead 21 to the closed cross-sectional circumferential direction is 50 mm, the projection height of the first bead 21 is 3 mm, the total width of the second bead 22 to the closed cross-sectional circumferential direction is 50 mm, and the depth of the second bead 22 is 3 mm.

In Example 1 shown in FIGS. 1A to 1C and 2A to 2C, the embossed portion 24 is provided at a position away from one end 1a by a distance of 60 mm. A total width $W_4$ of the embossed portion 24 to the closed cross-sectional circumferential direction is 30 mm, a length $H_1$ of the embossed portion 24 on each of the horizontal wall portions 2 and 3 along the closed cross-sectional circumferential direction is 15 mm, and a length $H_2$ of the embossed portion 24 on the vertical wall portion 4 along the closed cross-sectional circumferential direction is 15 mm.

Figure 4A:
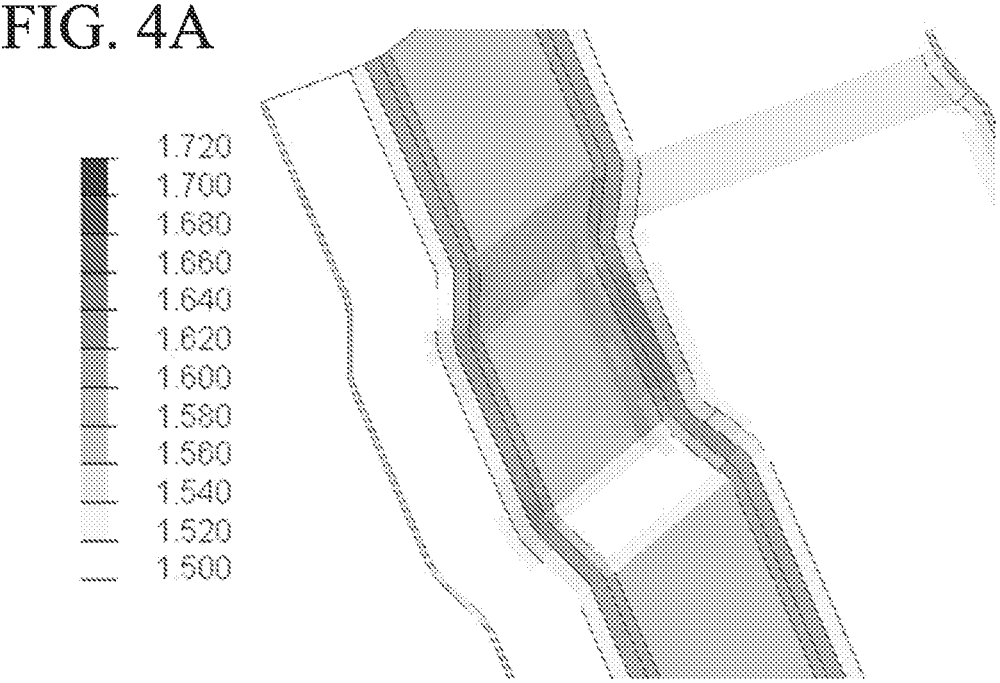
FIG. 4A is a perspective view showing sheet thickness distribution of an example of the related art.
Figure 4B:
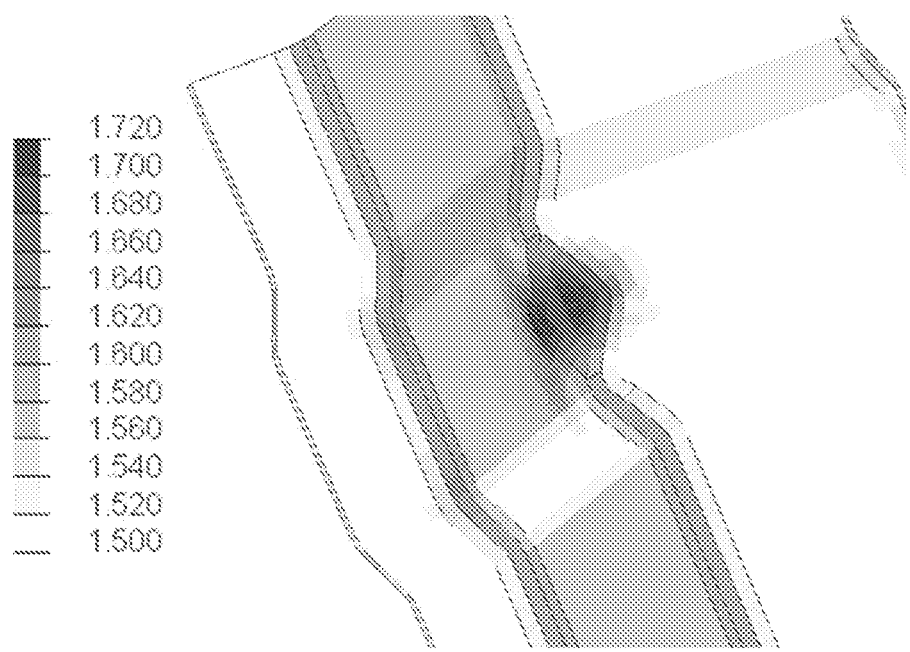
FIG. 4B is a perspective view showing sheet thickness distribution of the embossed portion of an example of the present invention.

Here, the measurement results of the sheet thickness of the embossed portion will be described with reference to FIGS. 4A and 4B. FIG. 4A is a perspective view showing the sheet thickness distribution of Comparative example 1, and FIG. 4B is a perspective view showing the sheet thickness distribution of the embossed portion of Example 1. As shown in FIG. 4A, the maximum sheet thickness of Comparative example 1 is about 1.6 mm at a position corresponding to the portion in which the embossed portion of Example 1 is formed and thus it is found that there is little difference between the maximum sheet thickness of Comparative example 1 and the thickness of the steel sheet of 1.5 mm. On the other hand, as shown in FIG. 4B, the maximum sheet thickness of the embossed portion of Example 1 is more than 1.72 mm and thus the thickness of the embossed portion is larger than the thickness of the steel sheet of 1.5 mm.

Figure 5:
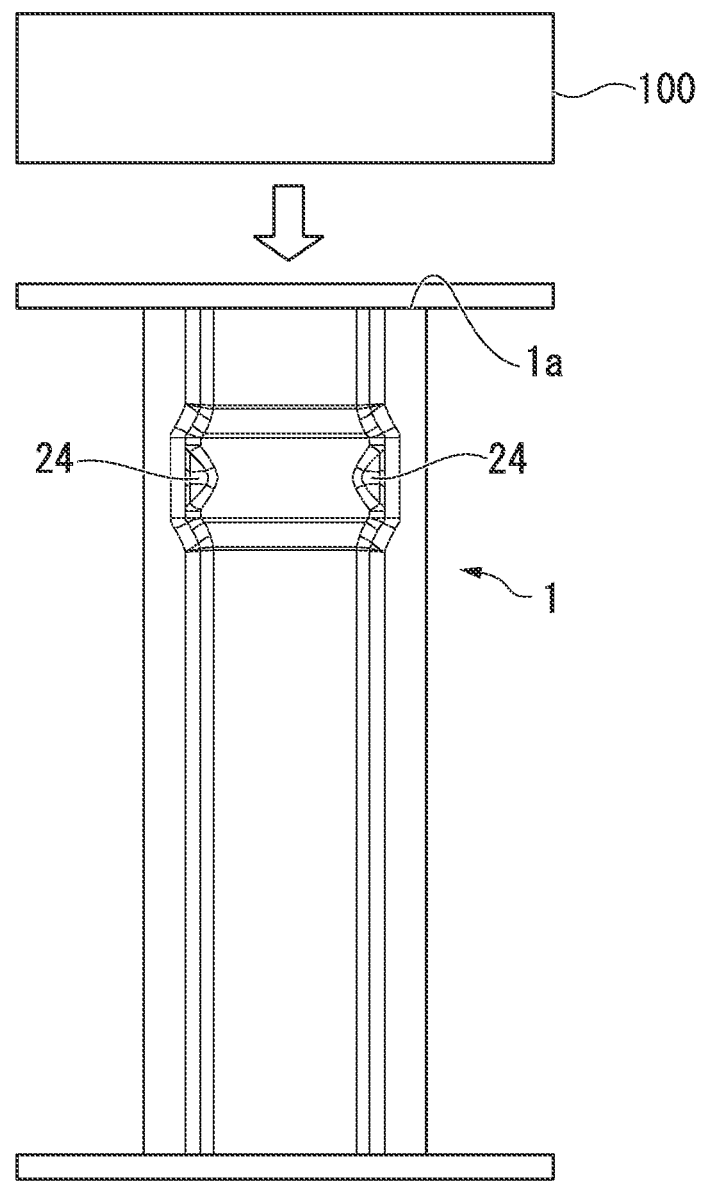
FIG. 5 is a schematic view showing an impact absorbing test method in Example 1 and Comparative example 1.

Next, an impact test was performed in Example 1 and Comparative example 1 by allowing a falling weight 100 having a mass of 400 kg to freely fall from a height of 3 m as shown in FIG. 5. At this time, the impact speed of the falling weight 100 was 7.67 m/s and the energy to be input to the frame member structure by the falling weight 100 was 11.8 kJ. In addition, after a load measuring unit (load cell) was arranged immediately below the frame member structure and the falling weight 100 was brought into contact with the frame member structure, a load history was measured. At the same time, the displacement history of the falling weight was also measured by a laser displacement gauge.

Figure 6:
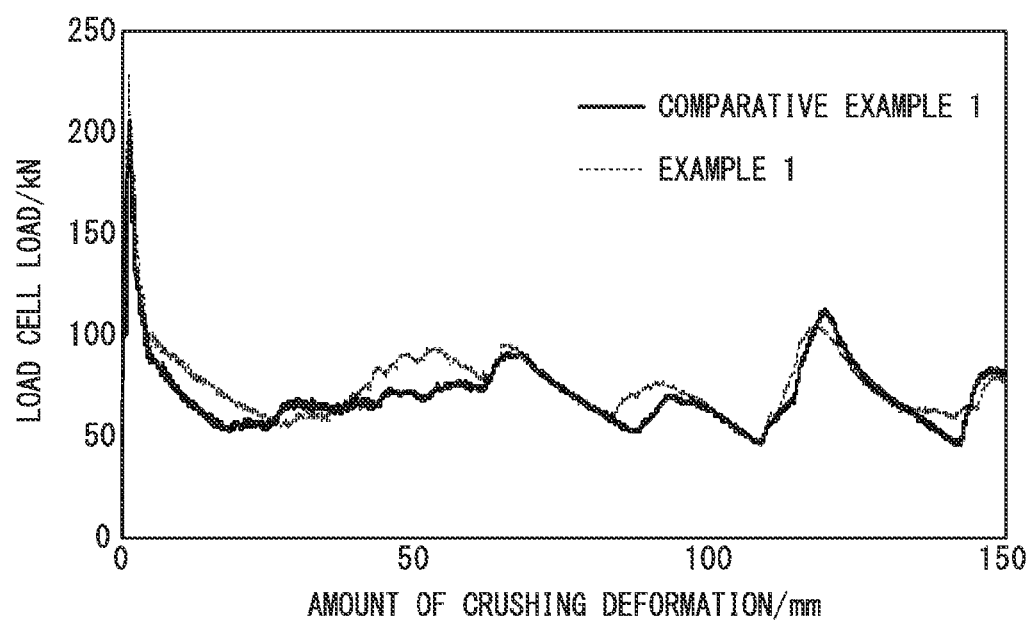
FIG. 6 is a diagram showing results of an impact absorbing test in Example 1 and Comparative example 1 and is a graph showing a relationship between the amount of crushing deformation of the vehicle frame member structure and a load cell load.

The measurement results are shown in FIGS. 6 and 7A to 7D. As shown in FIG. 6, an initial peak reaction force in Comparative example 1 is 205 kN, whereas an initial peak reaction force in Example 1 is 230 kN, and thus the initial peak reaction force in Example 1 is larger than that of Comparative example 1. In addition, when comparing the absorbed energies of the members when the amount of crushing deformation is 100 mm, the absorbed energy of Comparative example 1 is 7799 J, whereas the absorbed energy of Example 1 is 7077 J, and thus, the absorbed energy is increased.

In addition, in FIGS. 7A to 7D, the deformation of the members when 1 millisecond has elapsed from the falling weight impact is shown. The contour line of FIGS. 7A to 7D represent the amount of plastic strain. The amount of plastic strain which is input when the frame member structure is formed is divided and displayed. That is, in FIGS. 7A to 7D, only the amount of plastic strain input by the impact of the falling weight is displayed.

Figure 7A:
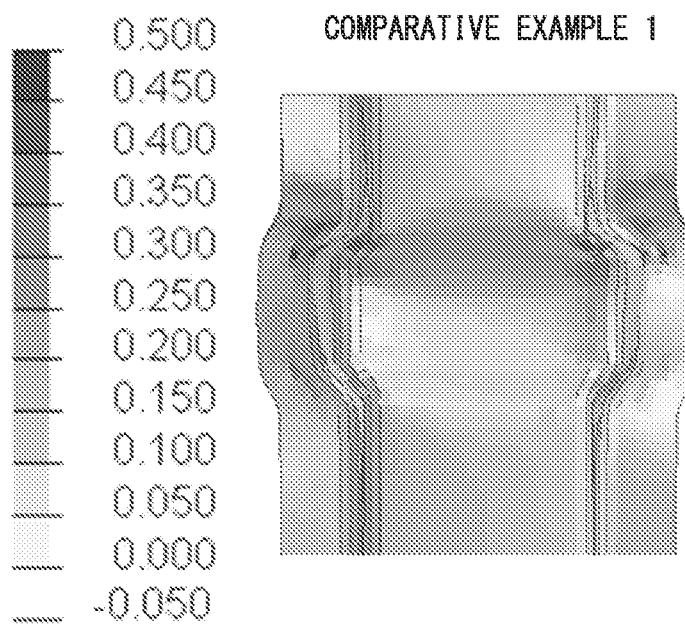
FIG. 7A is a view showing a member deformation state when 1 millisecond has elapsed after a falling weight is impacted during the impact absorbing test and is a front view showing a deformation state of Comparative example 1.
Figure 7B:
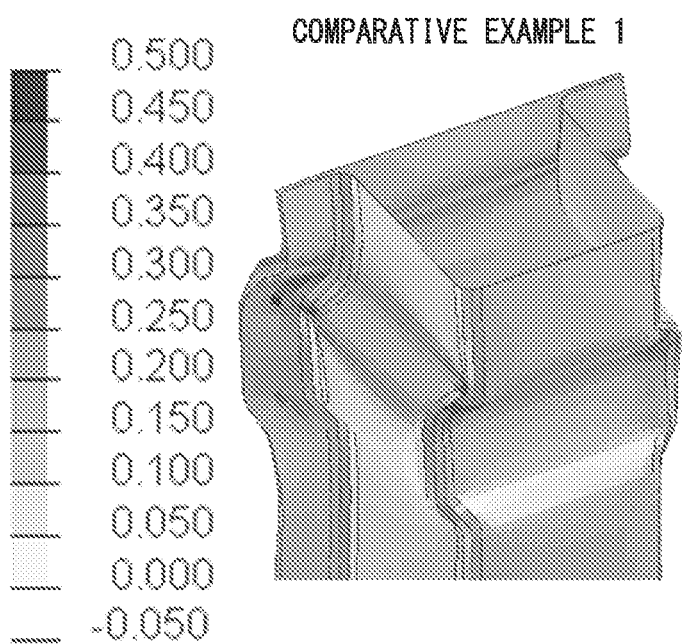
FIG. 7B is a perspective view corresponding to the front view of FIG. 7A.
Figure 7C:
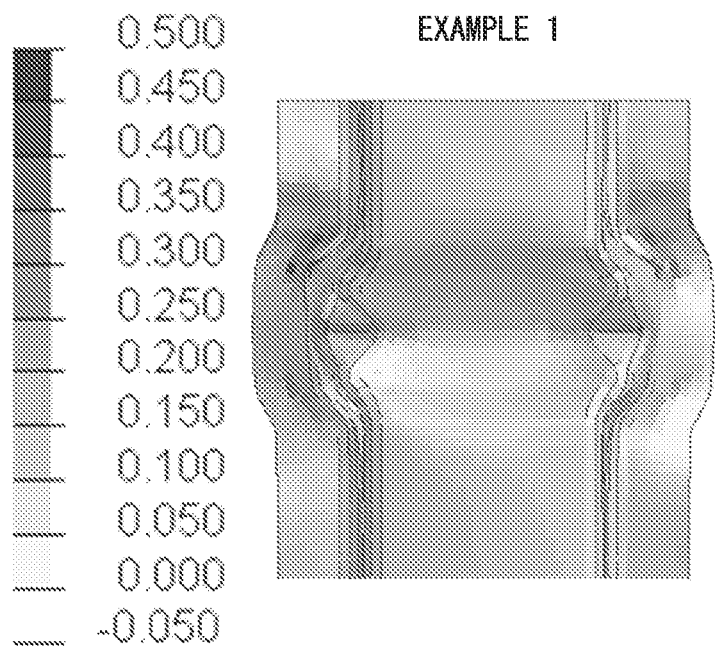
FIG. 7C is a view showing a member deformation state when 1 millisecond has elapsed after a falling weight is impacted during the impact absorbing test and is a front view showing a deformation state of Example 1.
Figure 7D:
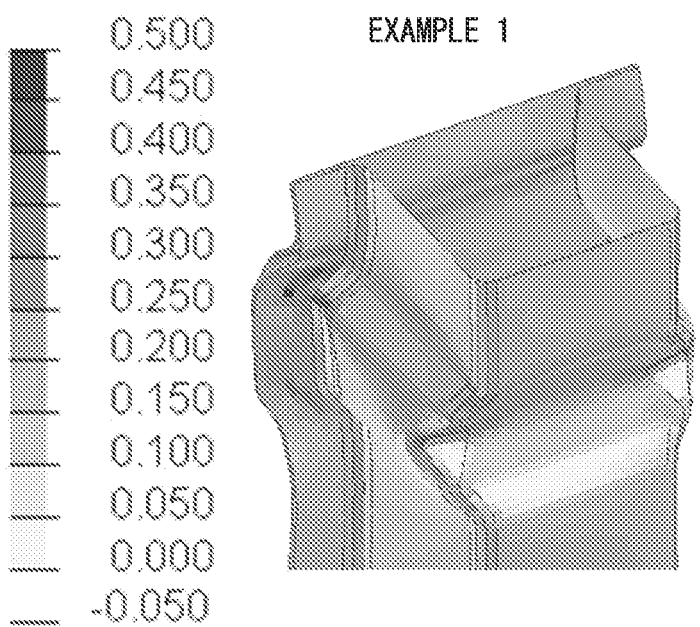
FIG. 7D is a perspective view corresponding to the front view of FIG. 7C.
Figure 8:
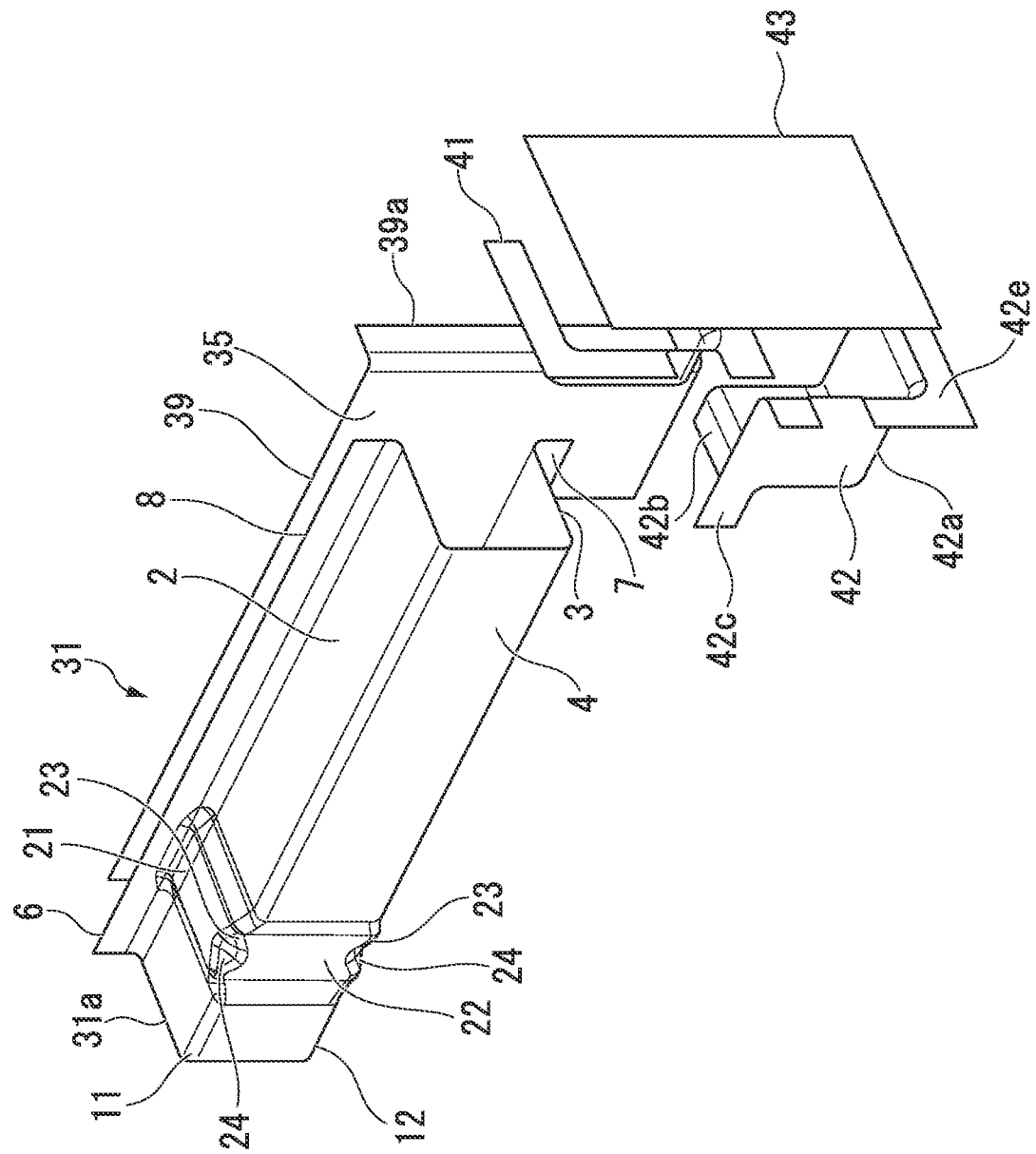
FIG. 8 is an exploded perspective view showing a vehicle frame member structure according to a second embodiment of the present invention.
Figure 9A:
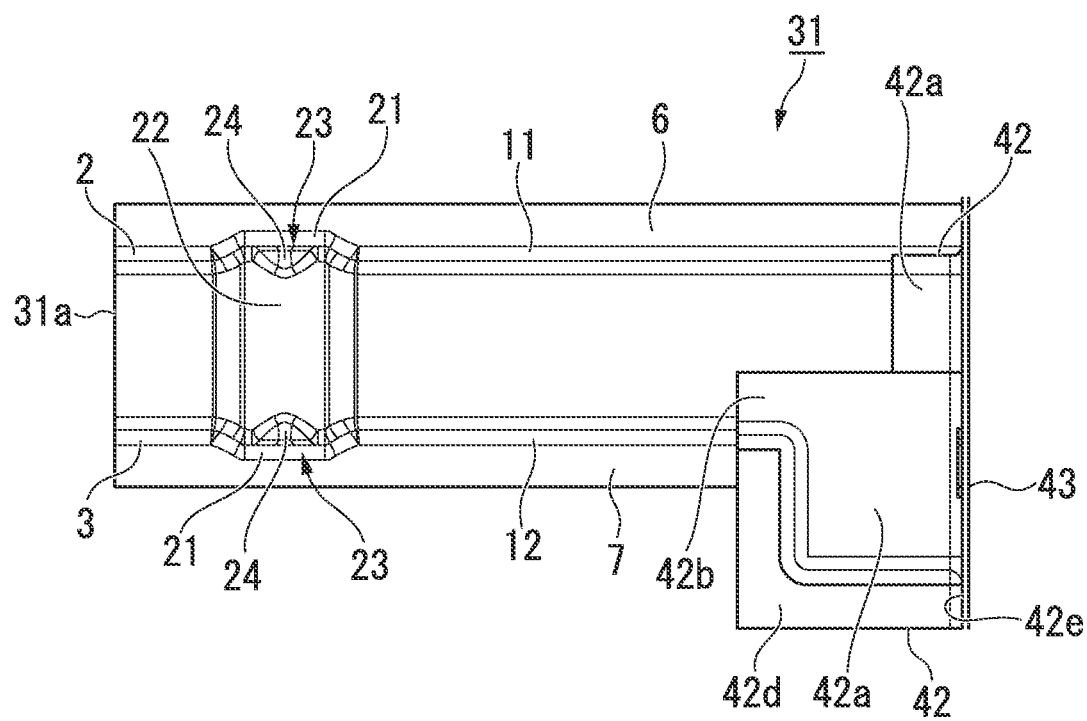
FIG. 9A is a side view showing the vehicle frame member structure according to the second embodiment of the present invention.
Figure 9B:
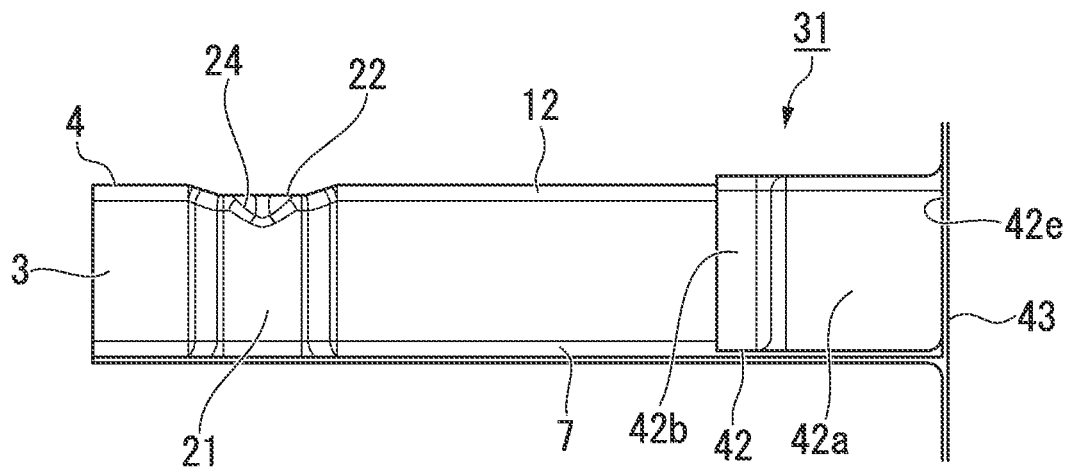
FIG. 9B is a plan view corresponding to the side view of FIG. 9A.

As shown in FIGS. 7A and 7B, in Comparative example 1, it is found that the reaction force is defined such that deformation is concentrated on the upper end of the corner portion in which the first bead and the second bead are connected to each other and the upper end is deformed immediately after the impact. On the other hand, as shown in FIGS. 7C and 7D, in Example 1, it is found that the reaction force is defined such that deformation is concentrated on the straight line connecting between the arranged embossed portions and the embossed portions are deformed immediately after the impact. When comparing to the sheet thickness distribution of FIGS. 4A and 4B, a significant increase in the sheet thickness is not observed at the reaction force definition position of Comparative example 1 when the member is formed. Contrarily, a significant increase in the sheet thickness is observed at the reaction force definition position (embossed portion) of Example 1. In Example 1, it is considered that since the sheet thickness is increased when the embossed portion is formed and the amount of working hardening input from the sheet thickness increasing working is large, the deformation resistance of the embossed portion is high and the initial peak reaction force is increased.

Further, as seen from FIG. 6, the reason why the absorbed energy is increased is that the reaction force increases until the amount of crushing deformation reaches 60 mm, in which crushing of the first and second bead portions is completed by the same principle as in the above-described increase in the initial peak reaction force. The absorbed energy is obtained by integrating the reaction force history of FIG. 6 and thus it is considered that the absorbed energy also increases by the same principle as in the above-described increase in the initial peak reaction force.

[Second Embodiment]

Next, a second embodiment and examples of the present invention will be described with reference to the drawings. Among components in the embodiment, the same reference numerals used in the description of the first embodiment are assigned to components similar to those described in the first embodiment and a description thereof will be provided.

A vehicle frame member structure 31 according to the embodiment shown in FIGS. 8 and 9A to 9C mainly has a closed cross-sectional structure including a pair of horizontal wall portions 2 and 3, and a pair of vertical wall portions 4 and 35 connected to the pair of the horizontal wall portions 2 and 3. For example, the vehicle frame member structure 31 is constituted of a first member 8 which has a hat-shaped cross section and is constituted of the pair of horizontal wall portions 2 and 3, one vertical wall portion 4, and a plate-like second member 39 constituting the other vertical wall portion 35, a first connecting member 41 and a second connecting member 42 attached to the tip end of the first member 8, and a third member 43 attached to the first connecting member 41 and the second connecting member 42.

The pair of horizontal wall portions 2 and 3 of the first member 8 is provided with flange portions 6 and 7, respectively. Then, the first member 8 and the second member 39 are integrally connected by spot-welding of the second member 39 to the flange portions 6 and 7 of the first member 8 and thus the closed cross-sectional structure including the horizontal wall portions 2 and 3 and the vertical wall portions 4 and 35 is formed.

In addition, the first connecting member 41 is provided for connecting the first member 8 and the third member 43. The first connecting member 41 is constituted of a first connecting portion 41a which is connected to the ends of the upper and lower horizontal wall portions 2 and 3 and the vertical wall portion 4 of the first member 8, and a second connecting portion 41b which is formed to be bent from the first connecting portion 41a and is connected to the third member 43.

Further, the second connecting member 42 is provided for connecting the first member 8, the second member 39, and the third member 43 to each other. The second connecting member 42 is constituted of a box-shaped main body 42a, a third connecting portion 42b, a fourth connecting portion 42c, a fifth connecting portion 42d, and a sixth connecting portion 42e. The third connecting portion 42b is formed to be bent from the main body 42a and is connected to the horizontal wall portion 3 on the lower side of the first member 8. The fourth connecting portion 42c is formed to be extended from the main body 42a and is connected to the vertical wall portion 4 of the first member 8. The fifth connecting portion 42d is formed to be bent from the main body 42a and is connected to the second member 39. The sixth connecting portion 42e is formed to be bent from the main body 42a and is connected to the third member 43.

The third member 43 is attached to the first and second connecting members 41 and 42 so as to cover a closed cross-sectional opening constituted of the first and second members 8 and 39 and an opening constituted of the box-shaped main body 42a of the second connecting member 42. In addition, the third member 43 is connected to a flange portion 39a of the second member 39.

The first member 8 is produced by press-forming the steel sheet to have a hat shape when seen from a cross section. As the steel sheet constituting the first member 8, as in the first embodiment, high strength steel sheet for a vehicle is suitably used and particularly high strength thin steel sheet, such as TRIP steel, in which work hardening easily occurs is preferably used. In addition, high strength steel sheet for a vehicle is also suitably used for the second member 39, the first and second connecting members 41 and 42, and the third member 43 in the same manner.

The pair of horizontal wall portions 2 and 3 and the vertical wall portion 4 of the first member 8 are connected to each other through the corner portions 11 and 12. In addition, first beads 21, which are projected beads formed along a closed cross-sectional circumferential direction, are provided on the pair of horizontal wall portions 2 and 3 of the first member 8. The first beads 21 are each constituted of a pair of inclined surfaces inclined from the horizontal wall portion 2 or 3, and a flat surface parallel to the surface of the horizontal wall portion 2 or 3 and positioned at the center of the pair of inclined surfaces. Further, a second bead 22 which is a recessed bead formed along the closed cross-sectional circumferential direction is provided on the vertical wall portion 4 of the first member 8. The second bead 22 is provided on the line extending from the first bead 21 in the closed cross-sectional circumferential direction. Then, the first beads 21 and the second bead 22 are connected at two corner portions 11 and 12, respectively. Connection portions 23 of the first and second beads 21 and 22 are corner portions constituted of the first beads 21 and the second bead 22. The connection portions 23 are placed at positions shifted from the corner portions 11 and 12 which connect the horizontal wall portions 2 and 3 and the vertical wall portion 4 by the height of the first beads 21 and the depth of the second bead 22.

The first bead 21 shown in FIGS. 8 and 9A to 9C is a projected bead and the second bead 22 is a recessed bead. However, the present invention is not limited thereto. For example, the first bead 21 may be a recessed bead and the second bead 22 may be a projected bead, or both the first bead 21 and the second bead 22 may be projected beads or recessed beads.

Next, as shown in FIGS. 8 and 9A to 9C, recessed embossed portions 24 are provided in the portions of the respective connection portions 23 in which the first beads 21 and the second bead 22 are connected. It is preferable that the embossed portion 24 be constituted of two triangular wall surfaces 24a and 24b and the both triangular bottom sides be connected. In this case, the shape of the entire embossed portion 24 as seen from a plan view is a rectangular shape close to a rhombus. In addition, a portion in which the two triangular wall surfaces 24a and 24b are connected to each other is formed as a valley fold portion 24c along the closed cross-sectional circumferential direction.

The embossed portion 24 is formed by recessing the corner portions 11 and 12 that are formed between the horizontal wall portions 2 and 3 and the vertical wall portion 4 when the steel sheet is press-formed and worked into the first member 8. Through such a process, the embossed portion 24 is formed as a thickened portion in which the peripheral steel is dammed up. Accordingly, the sheet thickness of the embossed portion 24 is larger than the sheet thickness of the horizontal wall portion 2 and 3 or the vertical wall portion 4. The sheet thickness of the embossed portion 24 is preferably about 1.1 times to 1.4 times, and more preferably about 1.15 times to 1.2 times of the sheet thickness of the horizontal wall portions 2 and 3 or the vertical wall portion 4. Further, since the amount of working of the embossed portion 24 is larger than that of the peripheral portion, the work hardening of the embossed portion 24 is promoted. Thus, the embossed portion 24 has a higher hardness than the hardness of the horizontal wall portions 2 and 3 or the vertical wall portion 4.

In addition, the embossed portion 24 may be provided in only one of two connection portions of the two first beads 21 and 21 provided on the pair of horizontal wall portions 2 and 3 and the second bead 22 provided on the vertical wall portion 4. Particularly, when it is assumed that a bending moment is applied to the frame member structure 1, it is preferable that the embossed portion 24 be provided in only a portion corresponding to the inner peripheral side of deflection caused by the bending moment. In the embodiment, it is preferable that the embossed portion 24 be provided on the side close to the horizontal wall portion 3 corresponding to the inner peripheral side of the deflection. When the bending moment is applied to the frame member structure 31, compression stress is concentrated on the inner peripheral side of the deflection. Thus, when the embossed portion 24 is provided on the inner peripheral side, the first and second beads 21 and 22 can be reinforced. Further, the embossed portion 24 may be provided on both of the two connection portions of the first beads 21 and the second bead 22. When the embossed portions are provided in both the connection portions, the stress concentration can be dispersed.

For example, the frame member structure 31 according to the embodiment is applied to a structural member, such as a front side member of a vehicle, to which an impact load is applied from the axial direction. The front side member is constituted of an outer panel arranged on the outer side of the vehicle width direction and an inner panel arranged on the inner side of the vehicle width direction. The frame member structure 31 according to the embodiment can be applied to a front side member having the first member 8 as an inner panel and the second member 39 as an outer panel. Further, the third member 43 can be applied to a part of the front cross member.

In addition, when an impact load is applied to a vehicle, the load is applied to the front side member in the axial direction and it is necessary that the front side member be reliably axially compression-deformed without bending at the axial intermediate portion to reliably absorb the impact energy at the time of impact. When the reaction force to the impact load is small, buckling easily occurs with a smaller impact load. Thus, it is necessary to set the reaction force to the impact load to be equal to or larger than a predetermined magnitude.

In order to solve the above problem, in the frame member structure 31 according to the embodiment, the first beads 21 and the second bead 22 function as a starting point of axial compression deformation when an impact load is applied and the crushing deformation of the horizontal wall portions 2 and 3 and the vertical wall portion 4 around the first beads 21 and the second bead 22 is promoted so that the frame member structure can absorb the impact energy.

In the frame member structure 31 according to the embodiment, the impact load input to the third member 43 is input to the first member 8 through the first and second connecting members 41 and 42. However, when the impact load is input to the first member, first, the second connecting member 42 is easily crushed. Thus, a bending moment may be applied to the first member 8. Even in this case, since the embossed portion 24 is provided in the connection portion of the first bead 21 and the second bead 22, the deflective strength of the first bead 21 and the second bead 22 on which the reaction force of the bending moment is relatively easily concentrated can be increased. Therefore, the frame member structure 31 can be prevented from being bent until the frame member structure 31 absorbs the impact energy sufficiently.

In addition, since the sheet thickness of the embossed portion 24 is larger than the sheet thickness of the horizontal wall portions 2 and 3 or the vertical wall portion 4, the rigidity of the horizontal wall portions 2 and 3 and the vertical wall portion 4 around the first beads 21 and the second bead 22 is increased and thus the deflective strength is further improved. Therefore, the reaction force to the deflection deformation caused by the bending moment is further improved and the impact resistance performance can be further improved.

Further, sine the embossed portion 24 is constituted of the two triangular wall surfaces 24a and 24b, the shape of the embossed portion 24 is simple and thus the embossed portion is easily press-formed. Therefore, the amount of strain accompanied by a reduction in the sheet thickness is small and thus the deflective strength of the horizontal wall portions 2 and 3 and the vertical wall portion 4 around the first beads 21 and the second bead 22 can be prevented from being lowered.

In addition, when the embossed portion is provided on only an inner peripheral corner portion of the deflection caused by the bending moment in the vehicle frame member structure 31 out of the two corner portions 11 and 12, the deflective strength of the horizontal wall portions 2 and 3 and the vertical wall portion 4 around the first beads 21 and the second bead 22 can be further improved. Therefore, the reaction force to the deflection deformation caused by the bending moment is further improved and thus the impact resistance performance can be further improved.

EXAMPLES 2 AND 3 AND COMPARATIVE EXAMPLES 2 AND 3

Figure 10A:
FIG. 10A is a side view showing another example of a vehicle frame member structure of the related art.
Figure 10A:
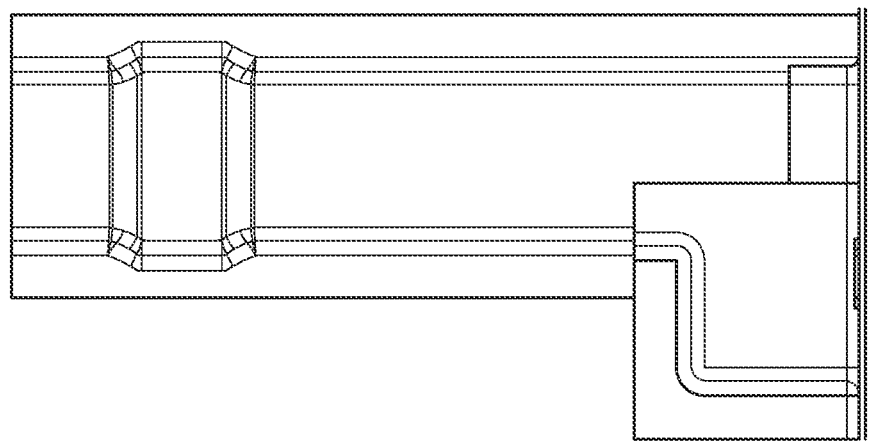
Figure 10B:
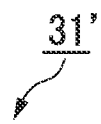
FIG. 10B is a plan view corresponding to the side view of FIG. 10A.
Figure 10B:
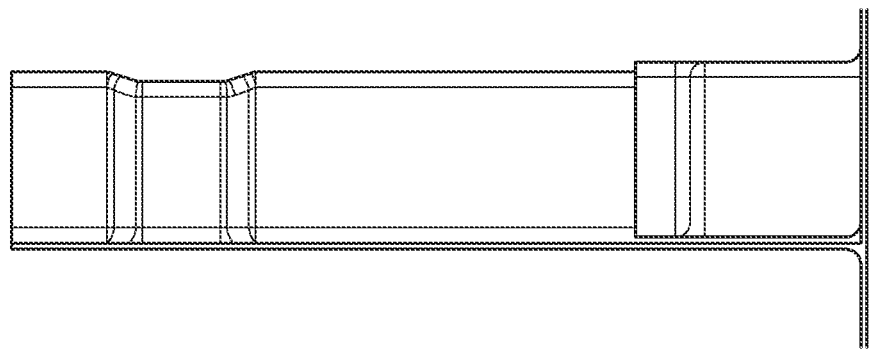
Figure 10C:
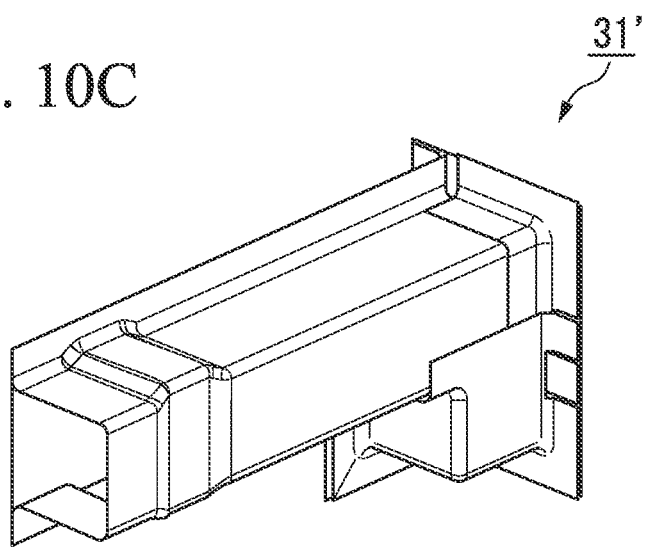
FIG. 10C is a perspective view corresponding to the side view of FIG. 1 0A.

As example 2, a frame member structure shown in FIGS. 8 and 9A to 9C was produced and the impact performance thereof was evaluated. A frame member structure 31 shown in FIGS. 8 and 9A to 9C is Example 2 and a frame member structure 31' shown in FIGS. 10A to 10C is Comparative example 2. Comparative example 2 shown in FIGS. 10A to 10C has the same configuration as that of Example 2 shown in FIGS. 8 and 9A to 9C except that the embossed portion is not provided.

When the frame member structures shown in FIGS. 8, 9A to 9C, and 10A to 10C were prepared, the steel sheet shown in Table 1 above was press-formed to form the first member having a hat shape when seen from a cross section. In addition, the second member, the third member, the first connecting member, and the second connecting member were formed by using the steel sheet shown in Table 1. Then, each member was spot-welded to produce the vehicle frame member structures shown in FIGS. 8 to 10C.

In the vehicle frame member structures shown in FIGS. 8 to 10C, an axial length L is 300 mm, a total width $W_1$ of the first member 8 and the second member 39 is 100 mm, a width $W_2$ of the vertical wall portion 4 is 60 mm, and a width $W_3$ of each of the horizontal wall portions 2 and 3 is 60 mm. Further, the total width of the first bead 21 to the closed cross-sectional circumferential direction is 50 mm, the projection height of the first bead 21 is 3 mm, the total width of the second bead 22 to the closed cross-sectional circumferential direction is 50 mm, and the depth of the second bead 22 is 3 mm. In addition, the projection length of the main body 42a of the second connecting member 42 from the horizontal wall portion 3 on the lower side of the first member 8 is 60 mm, the axial length of the main body 42a is 60 mm, and the width of the main body 42a is 60 mm.

In Example 2 shown in FIGS. 8 and 9A to 9C, the embossed portion 24 is provided at a position away from one end 31a by a distance of 60 mm. The total width of the embossed portion 24 to the closed cross-sectional circumferential direction is 30 mm, the length of the embossed portion 24 on each of the horizontal wall portions 2 and 3 along the closed cross-sectional circumferential direction is 15 mm, and the length of the embossed portion 24 on the vertical wall portion 4 along the closed cross-sectional circumferential direction is 15 mm.

Figure 11A:
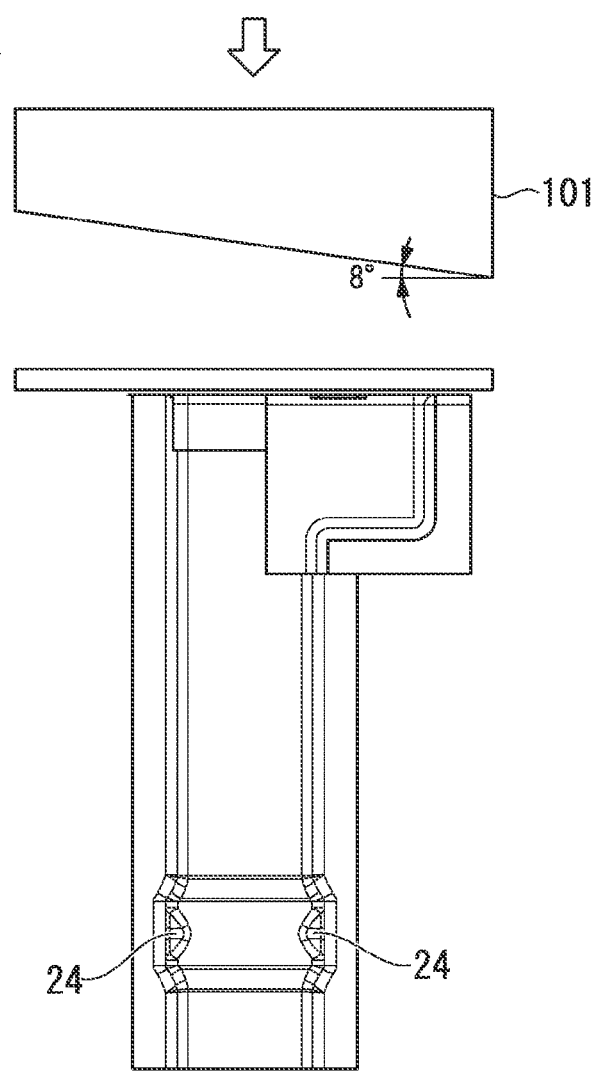
FIG. 11A is a schematic view showing an impact absorbing test method in Examples 2 and 3 and Comparative examples 2 and 3.

Next, an impact test was performed in Example 2 and Comparative example 2 by allowing a falling weight 101 having a mass of 400 kg to freely fall from a height of 3 m as shown in FIG. 11A. At this time, the impact speed of the falling weight 101 was 7.67 m/s and the energy to be input to the frame member structure by the falling weight 101 was 11.8 kJ. In addition, the falling weight 101 was formed to have a surface in contact with the structural body to be inclined at an angle of 8 degrees as shown in FIG. 11A so that the bending moment acted when the structural body was impacted with the falling weight 101. Further, after a load measuring unit (load cell) was arranged immediately below the frame member structure and the falling weight 101 was brought into contact with the frame member structure, a load history was measured. At the same time, the displacement history of the falling weight 101 was also measured by a laser displacement gauge.

In FIG. 11A, an example in which the embossed portions 24 are provided on both the left and the right sides of the drawing is Example 2, and an example in which the embossed portion 24 is not provided is Comparative example 2. Further, Example 3 as an example in which the embossed portion 24 was provided on only the right side of the drawing was prepared and Comparative example 3 as an example in which the first and the second beads 21 and 22 and the embossed portion 24 are not provided was prepared. The impact test shown in FIG. 11A was also performed in Example 3 and Comparative example 3. The position of the embossed portion of Example 3 corresponds to the position of the inner peripheral side of the deflection when the bending moment is applied.

A peak reaction force was calculated from the obtained load-displacement diagram and was set as an index for evaluating the impact absorption capacity. In addition, the load-displacement diagram until 100 mm displacement occurred from the contact of the falling weight with the structural body was integrated to calculate the absorbed energy and thus the obtained value was set as a value for evaluating the impact absorption capacity. The results are shown in Table 2.

Figure 11B:
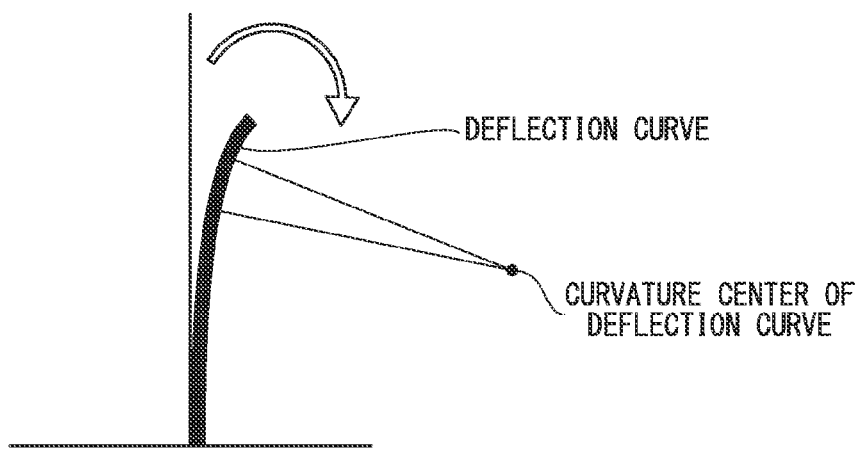
FIG. 11B is a schematic view showing a deflection curve of the vehicle frame member structure during an impact absorbing test.

As shown in Table 2, in Examples 2 and 3, when the embossed portion was provided on the side close to the curvature center (refer to FIG. 11B) of the deflection curve of the member caused by bending moment action, the peak reaction force and the absorbed energy exhibited satisfactory values.

In addition, in Comparative example 2, the axial compression deformation was realized as the deformation mode by the first and second beads and the absorbed energy was increased. However, the peak reaction force was decreased to 126 kN.

Further, in Comparative example 3, the peak reaction force was 138 kN, which was a satisfactory value. However, the frame member structure was broken by the bending moment input from the impact of the falling weight and thus the absorbed energy was not able to be increased.

TABLE 2

| | Peak reaction force [kN] | Absorbed E [J] | Remarks |
|---|---|---|---|
| Example 2 | 145 | 5586 | Embossed portions provided on both left and right sides |
| Example 3 | 145 | 5571 | Embossed portion provided on only right side |
| Comparative example 2 | 126 | 5302 | No embossed portion provided |
| Comparative example 3 | 138 | 2625 | No first bead, second bead, and embossed portion provided |

[Industrial Applicability]

According to the present invention, it is possible to provide a vehicle frame member structure having excellent impact resistance performance.

[Brief Description of the Reference Symbols]
  1, 31: VEHICLE FRAME MEMBER STRUCTURE
  2, 3: FIRST WALL PORTION (HORIZONTAL WALL PORTION)
  4, 5: SECOND WALL PORTION (VERTICAL WALL PORTION)
  21: FIRST BEAD
  22: SECOND BEAD
  11, 12: CORNER PORTION
  24: EMBOSSED PORTION
  24a, 24b: WALL SURFACE

The invention claimed is:

1. A vehicle frame member structure having a closed cross-sectional structure comprising a pair of first wall portions, and a pair of second wall portions connected to the pair of the first wall portions,
   wherein first beads, which are projected beads, are provided on the pair of first wall portions along a circumferential direction of the closed cross-sectional structure,
   a second bead, which is a recessed bead, is provided on either of the pair of second wall portions along the closed cross-sectional circumferential direction on a line extending from the first bead in the circumferential direction,
   the first beads and the second bead are connected to each other in two corner portions between the first wall portions and the second wall portion,
   the first bead has a first flat surface parallel to a surface of the first wall portion,
   the second bead has a second flat surface parallel to a surface of the second wall portion,
   a recessed embossed portion is provided in a connection portion of the first flat surface of the first bead and the second flat surface of the second bead in at least one of the corner portions, and
   the sheet thickness of the embossed portion is larger than the sheet thickness of one of the first wall portion and the second wall portion.

2. The vehicle frame member structure according to claim 1, wherein the embossed portion is constituted of two triangular wall surfaces.

3. The vehicle frame member structure according to claim 1, wherein, of the two corner portions, the embossed portion is provided in only an inner peripheral corner portion of deflection caused by a bending moment that is applied to the vehicle frame member structure at the time of impact.

4. The vehicle frame member structure according to claim 2, wherein, of the two corner portions, the embossed portion is provided in only an inner peripheral corner portion of deflection caused by a bending moment that is applied to the vehicle frame member structure at the time of impact.

* * * * *